Dec. 14, 1948.   G. H. DOWTY   2,455,982
SEALING WASHER
Filed July 16, 1945

Inventor:
GEORGE H. DOWTY,
By
Reynolds & Beach Attnys.

UNITED STATES PATENT OFFICE 2,455,982

SEALING WASHER

George H. Dowty, Cheltenham, England

Application July 16, 1945, Serial No. 605,298
In Great Britain May 3, 1944

Section 1, Public Law 690, August 8, 1946
Patent expires May 3, 1964

7 Claims. (Cl. 288—20)

There is a type of composite sealing washer comprising a resiliently deformable but substantially incompressible annular member, enclosed by, and positively restrained against outward displacement, by a confining ring axially shorter than the deformable member, the intention being to ensure that such spreading as occurs on the application of axial pressure shall be radially inwards. Such a sealing ring is disclosed in British patent to Killner, No. 537,654, dated November 12, 1940.

Such composite sealing washers have especially useful application in high pressure hydraulics where in installations the sealing ring is axially compressed between abutment flanges as the pipe union or other connection is tightened up until the abutment flanges contact and are halted by the axially directed faces of the confining ring to entrap the sealing ring completely externally, but leaving its bore open to pressure so that any pressure tending to expand the bore results (due to the presence of the confining ring) merely in achieving tighter sealing engagement between the abutment flanges and the edges of the sealing ring.

Conversely, the principle of the trapped type of seal above referred to may be employed to prevent leakage through a joint under external pressure.

It has been found that the Killner sealing washer, of common ownership with the present invention, is subject to certain definite, but scarcely predictable, disadvantages. For example, were it possible always to locate it and engage it carefully between abutment flanges or the like, in many cases no difficulties would arise, but lacking such care in the normal workman, or the knowledge that care is desirable, or the skill or time so to locate and engage it, it happens not infrequently that the sealing ring, first engaged by the abutment flanges because this sealing ring projects abruptly axially beyond and about a circle immediately adjacent the confining ring, is caused to spread outwardly to overlie the end of the confining ring. As the abutment flanges continue to approach the confining ring, this outwardly spread, overlying lip of the sealing ring is nipped between the abutment flange and the confining ring, and may be severed from the sealing ring. This nipping may not be uniform about the entire circle, and its effect is to weaken the seal, provide weak spots where leakage may start, and space the abutment flange from actual contact with the confining ring, and from one or more of these causes to invite leakage. Moreover, the effectiveness of the sealing washer for reuse is destroyed by such nipping.

The primary object of this invention is the provision of such a washer in an arrangement such that the possibility of nipping the sealing ring between the confining ring and an abutment flange or the like is practically eliminated, even under conditions where no particular care is taken to avoid it.

An object of the present invention is the provision of such a composite sealing washer in a form in which the possibility of the confining ring becoming detached from the sealing ring prior to installation is practically eliminated.

Also, it is an important object to provide such a composite sealing washer, inherently unitary in nature, capable of use in installations wherein the backing up of the washer by structural elements, such as a backing flange, is undesirable or not feasible, having such capacity by virtue of the substantially nondeformable character of the confining ring, even under the rather considerable pressures to which it may be subject, axially as well as radially.

It is a further object of the invention to provide such a composite sealing washer in which the confining ring is accurately centred lengthwise (i. e. axially) of the sealing ring.

The present invention, therefore, consists in a composite sealing washer comprising a sealing ring constituted by an annulus of resiliently deformable material and a substantially nondeformable confining ring inherently capable of constraining said sealing ring against expansion in one radial sense, and itself inherently form-sustaining against axial and radial pressure, said sealing ring having an axial length different in its bore from that at its periphery, to the shorter length wall of which the confining ring is secured.

In order that it may be clearly understood and more readily carried into effect the invention is hereinafter described with reference to the accompanying diagrammatic drawings of which Figure 1 is a plan view of a composite sealing washer according to the present invention.

Figure 2 is a sectional elevation on the line *ii. ii.* of Figure 1, while

Figure 1:
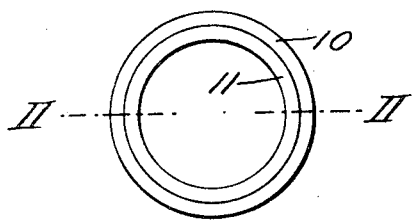

In the drawings the reference numeral 10 indicates the confining ring which, in this case, can be regarded as a steel or cast-iron ring, and the reference numeral 11 indicates the sealing ring, preferably formed of synthetic rubber which, whilst being resiliently deformable and incompressible, is resistant to oil.

Figure 2:
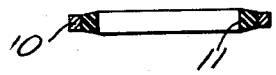

By reference to Figure 2 it will be seen that the sealing ring 11 in the illustrated form has its cross-section of the shape of a regular trapezium. The divergent sides lie in the end faces of the sealing ring, and the shorter and longer cylindrical sides lie, one in the inside bore of the sealing ring and the other in the periphery thereof. In the form shown the longer or pressure-exposed side lies in the bore, distant from the shorter side, and the latter abuts the bore surface of the confining ring 10. If the sealing washer were to be installed in a vacuum system instead of in a pressure system, for which latter use the illustrated washer is designed, then the sealing ring would surround the confining ring, and the longer axial face of the sealing ring would still be that face which is distant from the shorter face which abuts now the outer face of the confining ring. In any case, the longer pressure-exposed face of the sealing ring when unstressed is substantially cylindrical, is longer than the axial thickness of the confining ring, its greatest axial extent lies substantially at this free longer face, so that the latter terminates in quite sharp corners, and of these corners at least one, and preferably both, lie axially beyond the end faces of the confining ring. Thus some reversal, and some slight departure from the truly regular trapezoidal cross-section may be permitted. The shorter, abutted axial face of the sealing ring is in no case of greater axial extent or length than the face of the confining ring which it abuts; preferably their axial extent is identical, and they are coextensive, although some slight lesser extent of this face of the sealing ring, as compared to the abutted face of the confining ring, would still embody the spirit of the invention.

In manufacture the confining ring may be caused to adhere quite securely to the periphery of the sealing ring by the simple expedient of moulding the sealing ring in situ, in the confining ring. Heating the mold so filled for a time sufficient to cure the rubber effects a secure bond between the rings 10 and 11. The sealing washer is well adapted to manufacture in quantities by the convenient and inexpensive process briefly set forth above, and which is set forth in detail in the copending application of Lewis R. Ord, Serial No. 736,828, filed March 24, 1947.

When the parts are assembled but unstressed the free corners of the sealing ring 11 extend axially, and preferably equidistantly, beyond the end faces of the confining ring 10, and by their contact with the shoulders 13 of the nut or the like, and 14 of the second element of the joint to be sealed, support the confining ring 10 out of contact with these shoulders. As the nut 13 advances, by reason of the threaded connection at 12, towards the shoulder 14 it first compresses the free corners of the sealing ring 11. The rubber is stressed inwardly from these two corners, but progressively less as the distance from the corners increases, and the mutual reaction tends to urge the corners radially—in the illustrated form, inwardly. The divergent end faces tend to flatten towards parallelism, and the free axial face to bow concavely. As approach of the shoulders 13 and 14 continues, these tendencies are magnified, and the fluid distortion of the rubber sealing ring 11 increases, until eventually the shoulders 13 and 14 contact the end faces of the confining ring, and compression and distortion of the sealing ring 11 ceases. Now its free, pressure-subjected face or bore, formerly cylindrical, is concavely bowed. Its free corners have flowed inwardly, and are most highly stressed, so that they seat tightly and abruptly against the shoulders. Its other corners, adjacent the abutted face, are less highly stressed, and have not bulged outwardly, hence can not have been nipped between the confining ring and the shoulders. Fluid pressure applied to the now bowed inner face only serves to stress the rubber the more, and to press its corners the more tightly against the shoulders, to resist all entrance or escape of pressure therebetween. Negative pressure, should it occur, is resisted by the pressure at the corners due to the high compression of the rubber in this region. Nevertheless, when the joint is opened, the sealing ring relaxes, is undamaged, and the composite washer can be used over again and again.

The fact that the sealing ring is moulded in situ is in itself a feature of considerable advantage from the point of view of production because it obviates the necessity for surface finishing the interior of the confining ring and the external periphery of the sealing ring with any high degree of accuracy, and prevents relative axial displacement of the rings, which would displace an abutting corner of the sealing ring axially outwardly of the end face of the confining ring, and invite nipping.

Even for very high pressure work it is possible to get a satisfactory joint free from leakage by screwing up the connection finger tight.

Figure 3:
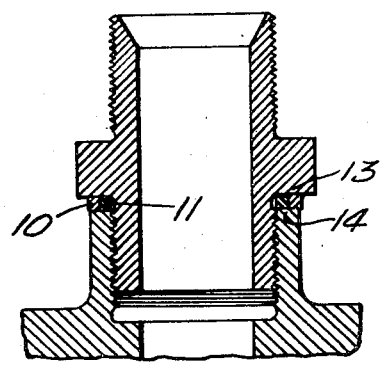
Figure 3 is a sectional elevation illustrating the application of the invention in a joint.

The invention is not intended to be limited to the details described and illustrated in the drawings, for obviously any process suitable to its production may be employed, and materials other than synthetic rubber can be used for the sealing ring and the confining ring might be of any material having the requisite tensile strength and resistance to deformation. In this connection it may be pointed out that a metallic confining ring is highly desirable, since it is nondeformable radially by high pressures, even though it be not backed by any backing flange—for instance, as arranged in Figure 3—and it is likewise non-deformable by axial crushing forces as between nut 13 and edge face 14; nevertheless, certain plastics and like materials, with or without reinforcement, are known to possess similar nondeformable properties, hence it is not desirable to require that the confining ring be made only of metal, if in fact it be substantially nondeformable under the conditions of use.

What I claim is:

1. A composite sealing washer comprising an annular sealing ring of resiliently deformable material of regular trapezoidal cross-section, the parallel unequal sides of which are respectively the bore and the periphery of the annulus, and, securely joined to and substantially coextensive with the shorter of said sides, a substantially nondeformable confining ring operative to confine radial spread of the sealing ring under axial pressure to spread in a sense away from said confining ring.

2. A composite sealing washer as in claim 1, wherein the confining ring encircles the sealing ring.

3. A composite sealing washer comprising an annular sealing ring of resiliently deformable material, having two generally axially extending faces, and an annular confining ring of substantially non-deformable material abutting said sealing ring along one of the axially extending faces of the latter, the abutted face of the sealing ring being of an axial length not greater than the axial length of the abutting face of the confining ring, and the other face of the sealing ring, when such ring is relaxed, being substantially cylindrical, and of an axial length greater than the greatest axial length of said confining ring.

4. A composite sealing washer as in claim 3, wherein the confining ring surrounds the sealing ring.

5. A composite sealing washer comprising an annular confining ring having two parallel, planar end faces and a generally axially-extending abutment face, and of substantially nondeformable self-sustaining material, and an annular sealing ring having two susbtantially cylindrical generally axially-extending faces, one whereof is of length equal to, coextensive with, and abutting, the abutment face of said confining ring, and its other axially-extending face being substantially cylindrical when unstressed, and of an axial length which exceeds the axial length of the other, abutted, face, to extend axially outwardly of both end faces of said confining ring, said sealing ring being of resiliently deformable material.

6. A composite sealing washer as in claim 5, characterized in that the sealing ring is of greatest axial extent at its face distant from, and disposed generally parallel to, its abutted face.

7. A composite sealing washer as in claim 5, characterized in that the sealing ring is of greatest axial extent at its face distant from, and disposed generally parallel to, its abutted face, and in that its end faces, between its faces of minimum and maximum axial extent, are substantially planar and divergent from that face of minimum axial extent, to intersect the two axially-extending faces at sharply defined corners.

GEORGE H. DOWTY.

REFERENCES CITED

The following references are of record in the file of this patent:

UNITED STATES PATENTS

| Number | Name | Date |
|---|---|---|
| 761,325 | Schier et al. | May 31, 1904 |
| 794,499 | Hageman | July 11, 1905 |
| 2,081,040 | King | May 18, 1937 |
| 2,191,044 | Seligman | Feb. 20, 1940 |
| 2,330,425 | Hilton | Sept. 28, 1943 |

FOREIGN PATENTS

| Number | Country | Date |
|---|---|---|
| 537,654 | Great Britain | 1941 |